United States Patent
Bergevin

(10) Patent No.: US 7,929,233 B2
(45) Date of Patent: Apr. 19, 2011

(54) SYSTEM, METHOD AND APPARATUS FOR SECTOR GRADING OF DEFECTIVE BIT PATTERNED MAGNETIC MEDIA IN HARD DISK DRIVES

(75) Inventor: Christopher W. Bergevin, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 220 days.

(21) Appl. No.: 12/345,698

(22) Filed: Dec. 30, 2008

(65) Prior Publication Data
US 2010/0165496 A1 Jul. 1, 2010

(51) Int. Cl.
G11B 27/36 (2006.01)
G11B 5/09 (2006.01)

(52) U.S. Cl. ............... 360/31; 360/45; 360/48; 360/53
(58) Field of Classification Search .............. None
See application file for complete search history.

(56) References Cited

U.S. PATENT DOCUMENTS

| | | |
|---|---|---|
| 6,445,525 B1 | 9/2002 | Young |
| 6,560,052 B2 | 5/2003 | Ng et al. |
| 6,757,119 B2 | 6/2004 | Leow et al. |
| 6,795,261 B2 | 9/2004 | Chia et al. |
| 6,976,196 B2 | 12/2005 | Watanabe |
| 7,133,228 B2 | 11/2006 | Fung et al. |
| 7,224,650 B2* | 5/2007 | Hino et al. ............ 369/47.14 |
| 7,275,179 B1 | 9/2007 | Coatney |
| 7,729,074 B2* | 6/2010 | Venkataramani et al. ...... 360/51 |
| 2002/0191319 A1 | 12/2002 | Liew et al. |
| 2006/0164747 A1* | 7/2006 | Lee ............................... 360/69 |
| 2007/0174682 A1 | 7/2007 | King |
| 2009/0034380 A1* | 2/2009 | Ngwe et al. .............. 369/47.15 |
| 2010/0027605 A1* | 2/2010 | Sankaranarayanan et al. ............................. 375/232 |

OTHER PUBLICATIONS

Bandic, Svonimir Z., et al., Patterned Magnetic Media: Impact of Nanoscale Patterning on Hard Drives, Sokid State Technology, www..fsi-intl.com, 2007.

* cited by examiner

Primary Examiner — Daniell L Negrón
Assistant Examiner — Regina N Holder

(57) ABSTRACT

A system for grading defective bit patterned magnetic media by disk sector in hard disk drives recovers a portion of any defective sectors at a lower areal density. The invention reduces the track pitch density for sectors containing amalgamated islands while leaving the remainder of the defect-free sectors in the zone optimized for linear bit density. This recovers a portion of the defective sector, approximately in proportion to the ratio of amalgamated islands over the original number of islands. A typical zone is first optimized for tracks per inch during formatting of the patterned media disk drive. The zone is then broken up into sectors that can each be optimized separately for linear bit density to ensure the maximum sustainable capacity for each sector.

14 Claims, 4 Drawing Sheets

SYSTEM, METHOD AND APPARATUS FOR SECTOR GRADING OF DEFECTIVE BIT PATTERNED MAGNETIC MEDIA IN HARD DISK DRIVES

BACKGROUND OF THE INVENTION

1. Technical Field

The present invention relates in general to bit patterned magnetic media and, in particular, to an improved system, method and apparatus for grading defective bit patterned magnetic media by disk sector in hard disk drives.

2. Description of the Related Art

The process of manufacturing a master disk for bit patterned magnetic media is expensive and time consuming. The projected cost of a master patterned media disk is more than one million dollars. One inherent difficulty in the manufacturing process for fabricating the master is the requirement that a rotary e-beam tool must run for several weeks to complete the master disk, Even with this careful and very precise process, there is a high probability that not all of the tracks on the master disk will be perfectly centered on the disk, or that the manufacturing process will form a perfect single domain, pre-defined, magnetic bit island.

For example, as illustrated in the schematic diagrams of FIGS. 1 and 2, a patterned media master disk 11 typically has many concentric or "on-center" tracks 13, 15 (e.g., two shown) of bit patterned media and, potentially, some non-concentric or "off-center" tracks 17 (e.g., one shown) of bit patterned media. Each track 13, 15, 17 comprises a circular array of discrete bits or islands 19. The intersection between the on-center track 13 and the off-center track 17 in Sector A causes two or more previously distinct islands 19 on the tracks to form one larger amalgamated bit 21 (FIG. 2). Furthermore, a sector on the disk that contains amalgamated bits 17 likely has a mirror-image amalgamated bit 21 on the other side of the disk (i.e., compare Sectors A and A', which are about 180 degrees apart), thereby doubling the number of defective sectors.

One solution to this problem is to map the defective sectors on the master disk as being unusable. This solution is readily workable, but at a cost of reduced capacity of the disk. An alternate solution is to create a new master without the defective tracks, but at a significant additional cost. Although these solutions are workable, an improved solution that overcomes the problem and the limitations of prior solutions would be desirable.

SUMMARY OF THE INVENTION

Embodiments of a system, method, and apparatus for grading defective bit patterned magnetic media by disk sector in hard disk drives are disclosed. The invention recovers a portion of the "defective" sectors, albeit at a much lower areal density (e.g., less than half of the original density). The invention reduces the track pitch density for tracks containing amalgamated islands, while leaving the remainder of the defect-free tracks in the sector optimized for track pitch density. This reduced track per inch (TPI) requirement recovers a portion of the defective sector, approximately in proportion to the ratio of amalgamated islands over the original number of islands.

In one embodiment, a typical zone is first optimized for tracks per inch (TPI) during formatting of the patterned media disk drive. The zone is then broken up into sectors that can each be optimized separately for linear bit density to ensure the maximum sustainable capacity for each sector. For example, a multi-grading process flow may comprise the following sequential steps: optimizing drive parameters, such as write current optimization, calculating a default TPI, TPI selection based on magnetic core width (MCW), optimizing soft error rate (i.e., a ratio of bad bits to good bits) and overwrite section (i.e., a measure of the signal strength required to write over a previously written signal) to optimize bits per inch for each sector, to arrive at the desired data storage capacity of the disk drive.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Figure 1:
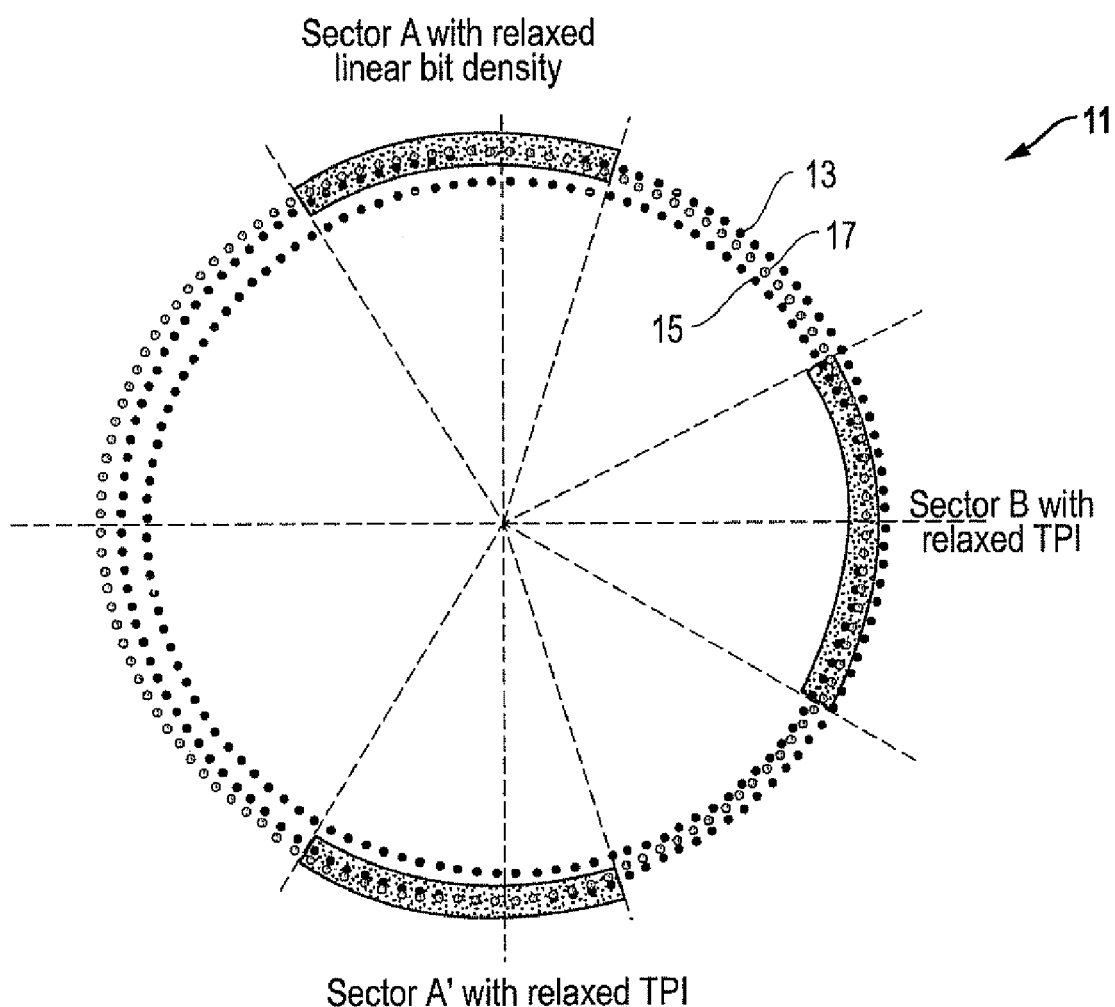
FIG. 1 is a schematic diagram of a bit patterned media master disk.
Figure 2:
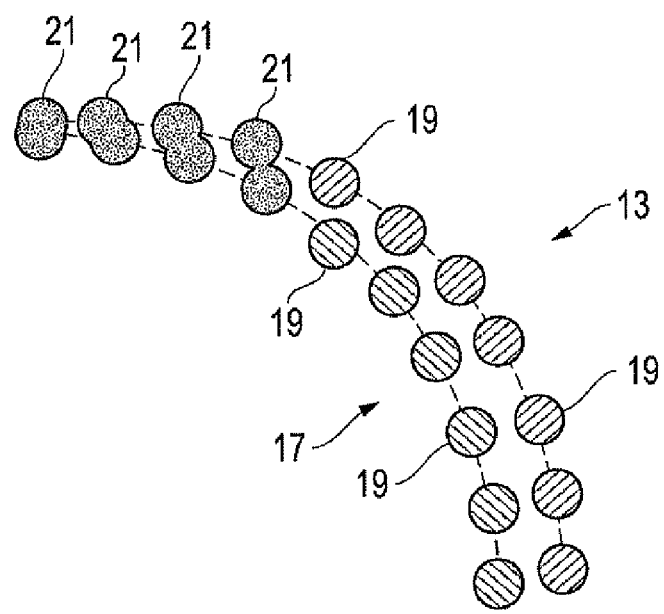
FIG. 2 is an enlarged schematic diagram of the bit patterned media master disk of FIG. 1 illustrating non-concentric tracks.
Figure 3:
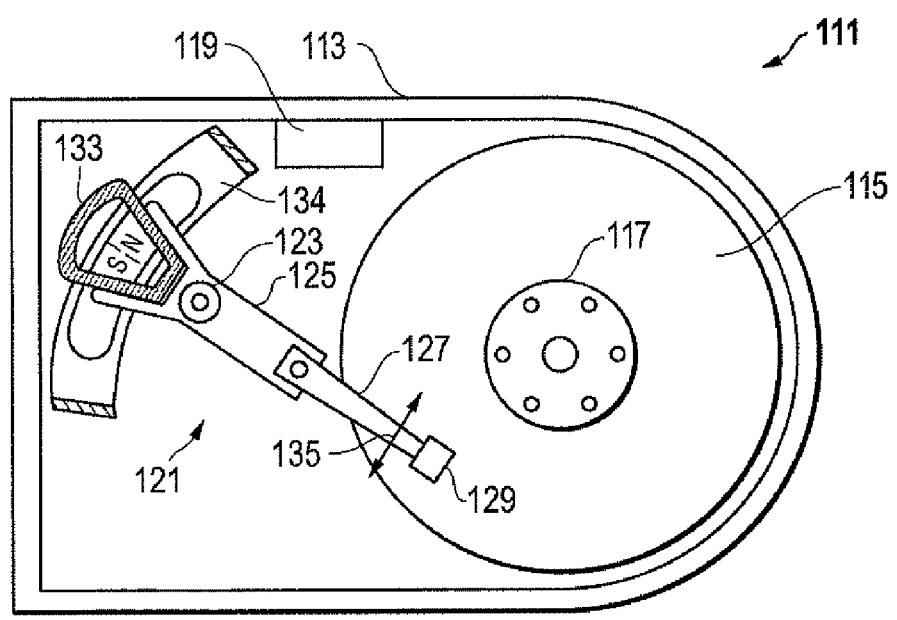
FIG. 3 is schematic plan view of one embodiment of a hard disk drive constructed in accordance with the invention.
Figure 4:
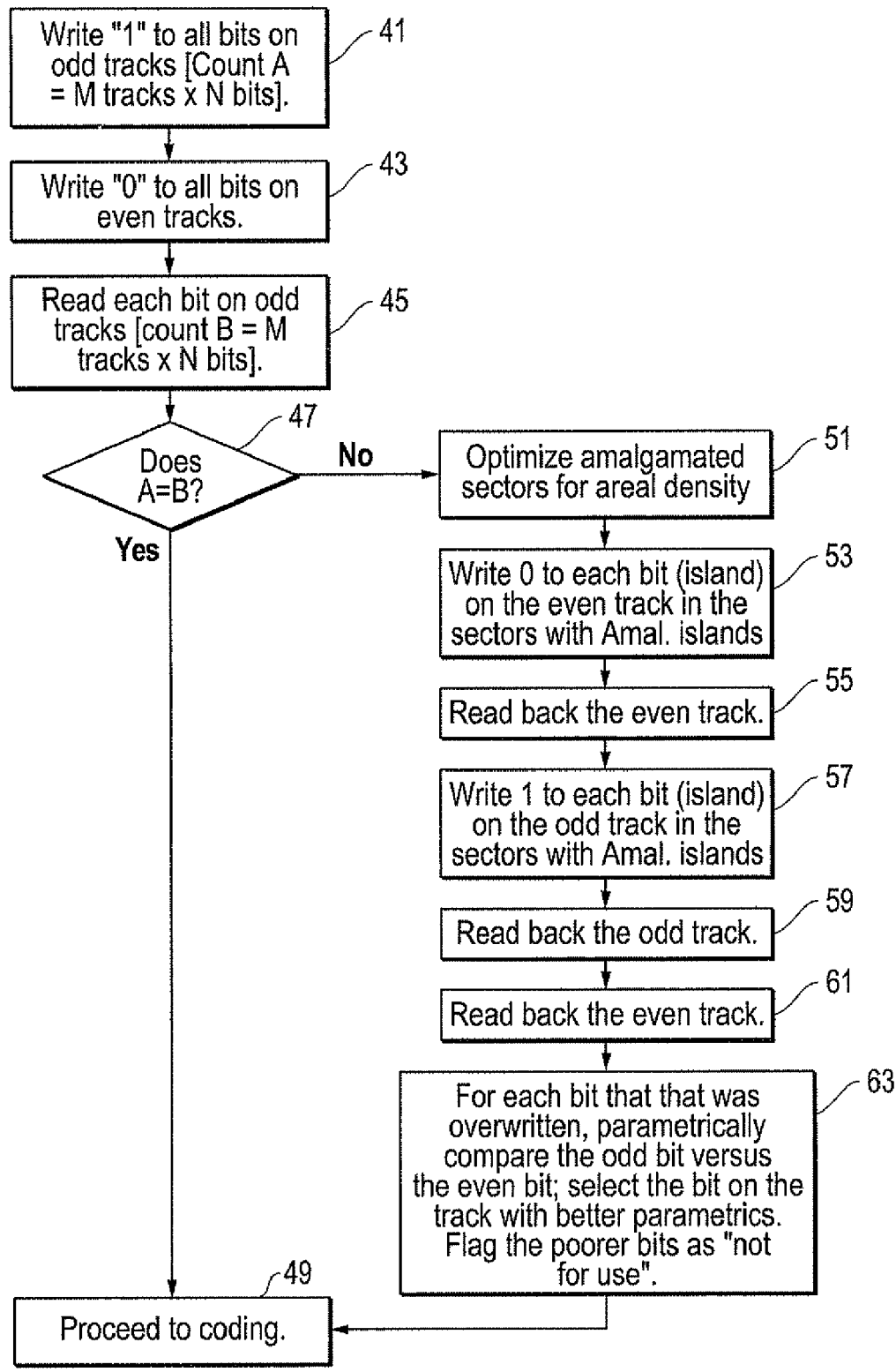
FIG. 4 is a process flowchart of one embodiment of a method constructed in accordance with the invention.
Figure 5:
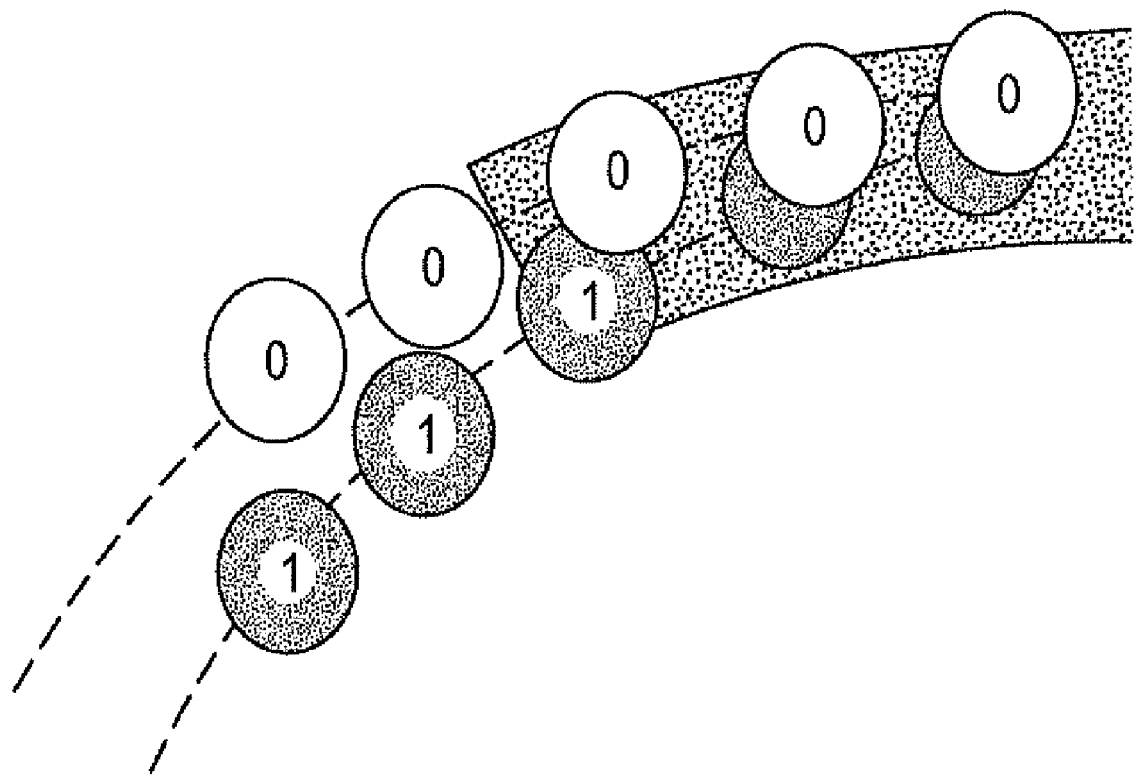
FIG. 5 is an enlarged schematic diagram of one embodiment of a master disk with non-concentric tracks constructed in accordance with the invention.

Referring to FIGS. 3-5, embodiments of a system, method and apparatus for grading defective bit patterned magnetic media by disk sector in hard disk drives are disclosed. The tracks in a conventional, non-patterned media hard disk drive (HDD) are concentric by nature since the disk-stack center of rotation is constant and data is written to the tracks after the HDD assembly is completed.

Typically, bit error rate (BER) is optimized by concentric cylinders or zones where the track density (i.e., tracks per inch or TPI) and the linear bit density (i.e., bits per inch or BPI) are held constant for all the sectors in the entire zone. Both TPI and BPI are predetermined for an HDD manufactured with patterned media. A read/write head that is conventionally formatted will detect errors when it flies over sectors containing amalgamated bits or islands. For a defect of this type, the sector containing amalgamated islands was previously considered unusable and mapped into a defect table so that it is not used for data storage.

Furthermore, even the formation of a perfectly bit patterned media master does not guarantee good results in the downstream manufacture of daughter-patterned media disks. There are yields associated with any manufacturing process that also could lead to the creation of amalgamated bits.

As shown in FIGS. 4 and 5, one embodiment of a method of determining which tracks have amalgamated islands is shown. The method is a process for grading defective patterned media sectors, and for selecting the optimum bit from an amalgamated island. The method determines which adjacent tracks contain amalgamated islands by writing "1's" to odd track(s) and "0's" to even tracks. Next, the tracks are read back to determine which odd or even bits were over-written.

For example, one embodiment of the method begins as indicated in step 41, wherein a "1" is written to all bits on odd tracks, counting A=M tracks×N bits. A "0" is written to all bits on even tracks (step 43); and each bit is read on odd tracks, counting B=M tracks×N bits (step 45). Next, a determination is made (step 47) whether "A=B". If so, the method proceeds to step 49 (e.g., to proceed to coding). If not, the method proceeds to step 51 to optimize amalgamated sectors for areal density.

Current multi-grading techniques disposition a failed track by reducing the linear bit density (e.g., a variable) until it passes (e.g., a parametric test). Defective portions of the media that contain "hard errors" are excluded from data sectors. However, the same parametric test(s) may be applied to evaluate patterned media sectors that contain amalgamated bits. Prior to the present invention, these sectors were considered a failed track, and subsequently over-written by a track (i.e., those with bits that test parameterically lower) and dispositioned as "not for use."

In contrast, one embodiment of the invention proceeds to write "0" to each bit (i.e., island; see, e.g., FIG. 5) on the even track in the sectors with amalgamated islands (step 53); read back the even track (step 55); write "1" to each bit or island on the odd track in the sectors with amalgamated islands (step 57); read back the odd track (step 59); read back the even track (step 61); and, for each bit that was overwritten, parametrically compare the odd bit versus the even bit, selecting the bit on the track with better parametrics, and flagging the poorer bits as "not for use" (step 63). The method then proceeds to step 49 for coding.

While the invention has been shown or described in only some of its forms, it should be apparent to those skilled in the art that it is not so limited, but is susceptible to various changes without departing from the scope of the invention.

What is claimed is:

1. A method of grading defective bit patterned magnetic media by disk sector in a hard disk drive, comprising:
   (a) providing a disk with bit patterned magnetic media having tracks of bits that are divided into sectors;
   (b) determining if any of the sectors have tracks that are not concentric such that the bits on adjacent ones of the tracks are amalgamated;
   (c) designating sectors having amalgamated bits as "defective;" and
   (d) recovering a portion of the defective sectors such that the defective sectors have an areal density that is lower than an areal density of other ones of the sectors; and
   steps (b)-(d) comprise writing "1's" to all bits on odd tracks, counting A=M tracks×N bits; writing a "0" to all bits on even tracks; reading each bit on odd tracks, counting B=M tracks×N bits; determining whether "A=B"; if A=B, proceeding to coding; and, if A≠B, optimizing amalgamated sectors for areal density.

2. A method according to claim 1, wherein step (d) comprises reducing a track bit density of the defective sectors from a track bit density of said other ones of the sectors, such that the defective sectors have reduced tracks per inch (TPI).

3. A method according to claim 2, wherein the defective sectors have a TPI approximately in proportion to a ratio of amalgamated bits to a total number of bits.

4. A method according to claim 1, wherein step (a) further comprises optimizing the bit patterned magnetic media for tracks per inch (TPI) during formatting, dividing the bit patterned magnetic media into sectors, and separately optimizing the sectors for track density to ensure a maximum sustainable capacity for each sector despite any defects therein.

5. A method according to claim 4, wherein step (a) further comprises formatting hard disk drive parameters, optimizing write current, calculating a default TPI to allow for TPI selection by zone based on magnetic core width, measuring soft error rate and overwrite to optimize bits per inch per zone to achieve a desired data storage capacity of the hard disk drive.

6. A method according to claim 1, wherein if A≠B, optimizing amalgamated sectors for areal density comprises: writing "0" to each bit on the even track in the sectors with amalgamated islands; reading back the even track; writing "1" to each bit or island on the odd track in the sectors with amalgamated islands; reading back the odd track; reading back the even track; and, for each bit that was overwritten, parametrically comparing the odd bit to the even bit, selecting the bit on the track with better parametrics, and flagging the poorer bits as "not for use," and then proceeding to coding.

7. A method of grading defective bit patterned magnetic media by disk sector in a hard disk drive, comprising:
   (a) providing a disk with bit patterned magnetic media having tracks of bits that are divided into sectors;
   (b) determining if any of the sectors have bits on adjacent tracks that are amalgamated;
   (c) designating sectors having amalgamated bits as "defective;"
   (d) recovering a portion of the defective sectors such that the defective sectors have an areal density that is lower than an areal density of other ones of the sectors; and
   steps (b)-(d) comprise writing "1's" to all bits on odd tracks, counting A=M tracks×N bits; writing a "0" to all bits on even tracks; reading each bit on odd tracks, counting B=M tracks×N bits; determining whether "A=B"; if A=B, proceeding to coding; and, if A≠B, optimizing amalgamated sectors for areal density.

8. A method according to claim 7, wherein step (d) comprises reducing a track bit density of the defective sectors from a track bit density of said other ones of the sectors, such that the defective sectors have reduced tracks per inch (TPI).

9. A method according to claim 8, wherein the defective sectors have a TPI approximately in proportion to a ratio of amalgamated bits to a total number of bits.

10. A method according to claim 7, wherein step (a) further comprises optimizing the bit patterned magnetic media for tracks per inch (TPI) during formatting, dividing the bit patterned magnetic media into sectors, and separately optimizing the sectors for track density to ensure a maximum sustainable capacity for each sector despite any defects therein.

11. A method according to claim 10, wherein step (a) further comprises formatting hard disk drive parameters, optimizing write current, calculating a default TPI to allow for TPI selection by zone based on magnetic core width, measuring soft error rate and overwrite to optimize bits per inch per zone to achieve a desired data storage capacity of the hard disk drive.

12. A method according to claim 7, wherein if A≠B, optimizing amalgamated sectors for areal density comprises: writing "0" to each bit on the even track in the sectors with amalgamated islands; reading back the even track; writing "1" to each bit or island on the odd track in the sectors with amalgamated islands; reading back the odd track; reading back the even track; and, for each bit that was overwritten, parametrically comparing the odd bit to the even bit, selecting the bit on the track with better parametrics, and flagging the poorer bits as "not for use," and then proceeding to coding.

13. A method of grading defective bit patterned magnetic media by disk sector in a hard disk drive, comprising:
  (a) providing a disk with bit patterned magnetic media having tracks of bits that are divided into sectors;
  (b) optimizing the bit patterned magnetic media for tracks per inch (TPI) during formatting, dividing the bit patterned magnetic media into sectors, and separately optimizing the sectors for track density to ensure a maximum sustainable capacity for each sector despite any defects therein;
  (c) formatting hard disk drive parameters, optimizing write current, calculating a default TPI to allow for TPI selection by zone based on magnetic core width, measuring soft error rate and overwrite to optimize bits per inch per zone to achieve a desired data storage capacity of the hard disk drive;
  (d) determining if any of the sectors have bits on adjacent tracks that are amalgamated;
  (e) designating sectors having amalgamated bits as "defective;"
  (f) recovering a portion of the defective sectors such that the defective sectors have an areal density that is lower than an areal density of other ones of the sectors, reducing a track bit density of the defective sectors from a track bit density of said other ones of the sectors, such that the defective sectors have reduced TPI, and wherein the defective sectors have a TPI approximately in proportion to a ratio of amalgamated bits to a total number of bits; and
  steps (d)-(f) comprise writing "1's" to all bits on odd tracks, counting A=M tracks×N bits; writing a "0" to all bits on even tracks; reading each bit on odd tracks, counting B=M tracks×N bits; determining whether "A=B"; if A=B, proceeding to coding; and, if A≠B, optimizing amalgamated sectors for areal density.

14. A method according to claim 13, wherein, if A≠B, optimizing amalgamated sectors for areal density comprises: writing "0" to each bit on the even track in the sectors with amalgamated islands; reading back the even track; writing "1" to each bit or island on the odd track in the sectors with amalgamated islands; reading back the odd track; reading back the even track; and, for each bit that was overwritten, parametrically comparing the odd bit to the even bit, selecting the bit on the track with better parametrics, and flagging the poorer bits as "not for use," and then proceeding to coding.

\* \* \* \* \*